United States Patent [19]

Sechrist

[11] Patent Number: 5,001,095
[45] Date of Patent: Mar. 19, 1991

[54] METHOD AND APPARATUS FOR CONTROLLING MOISTURE BY FLUE GAS SEGREGATION

[75] Inventor: Paul A. Sechrist, Des Plaines, Ill.

[73] Assignee: UOP, Des Plaines, Ill.

[21] Appl. No.: 437,149

[22] Filed: Nov. 16, 1989

[51] Int. Cl.$^5$ ............................................. B01J 20/34
[52] U.S. Cl. ..................................... 502/41; 208/140; 208/150; 423/210
[58] Field of Search ................ 208/140, 150; 423/210; 502/41

[56] References Cited

U.S. PATENT DOCUMENTS

| | | | |
|---|---|---|---|
| 3,020,240 | 2/1962 | Lockett, Jr. | 208/140 |
| 3,647,680 | 3/1972 | Greenwood et al. | 208/65 |
| 3,652,231 | 3/1972 | Greenwood et al. | 208/140 |
| 3,684,698 | 8/1972 | Hallman | 208/140 |
| 3,692,496 | 9/1972 | Greenwood et al. | 208/169 |
| 4,274,942 | 6/1981 | Bartholic et al. | 208/150 |
| 4,354,925 | 10/1982 | Schorfheide | 288/65 |
| 4,810,360 | 3/1989 | Haddad et al. | 208/152 |
| 4,853,107 | 8/1989 | Haddad et al. | 208/152 |

*Primary Examiner*—Anthony McFarlane
*Attorney, Agent, or Firm*—Thomas K. McBride; John G. Tolomei

[57] ABSTRACT

A semi-continuous process for combusting coke from catalyst particles in a fixed bed is improved by segregating flue gas from the combustion process into a high moisture content flue gas stream which is withdrawn from the process and a relatively low moisture content flue gas stream which is combined with an oxygen-containing make-up gas and recycled to the process. When coke is combusted in a fixed bed to which catalyst is added at an inlet and withdrawn from an outlet on a semi-continuous basis, hydrogen from the coke is quickly combusted whereas less volatile coke components are more slowly combusted. As a result, flue gas passing through the catalyst that has just entered the bed will have the highest water concentration. By separately recovering the flue gas stream having this high moisture content, the overall equilibrium level of water in a flue gas/recycle gas that circulates through the process is lowered. Segregation of flue gas can be easily accomplished in a vertically arranged catalyst bed by adding a baffle to the flue gas collection space that subdivides the collection space into separate chambers. The amount of high moisture content withdrawn from the process can be equal to the amount of make-up gas entering the flue gas/recycle gas loop. A larger amount of high moisture content flue gas than that vented from the process can be collected with the non-vented gas passing through a drier and other treatment steps before re-entering the process as part of the make-up gas. Using the unvented portion of the high moisture content flue gas increases the efficiency of using driers since a relatively large amount of water can be removed from a small volume of flue gas.

11 Claims, 2 Drawing Sheets

METHOD AND APPARATUS FOR CONTROLLING MOISTURE BY FLUE GAS SEGREGATION

FIELD OF THE INVENTION

This invention relates to the art of catalytic conversion of hydrocarbons to useful hydrocarbon products. More specifically, it relates to the reconditioning of spent hydrocarbon conversion catalyst so that the catalyst can be reused in a hydrocarbon conversion reaction.

BACKGROUND OF THE INVENTION

Catalytic processes for the conversion of hydrocarbons are well known and extensively used. Invariably the catalysts used in these processes become deactivated for one or more reasons. Where the accumulation of coke deposits causes the deactivation, reconditioning of the catalyst to remove coke deposits restores the activity of the catalyst. Coke is normally removed from catalyst by contact of the coke containing catalyst at high temperature with an oxygen-containing gas to combust and remove the coke in a regeneration process. These processes can be carried out in-situ or the catalyst may be removed from a vessel in which the hydrocarbon conversion takes place and transported to a separate regeneration zone for coke removal. Arrangements for continuously or semi-continuously removing catalyst particles from a reaction zone and for coke removal in a regeneration zone are well known.

In order to combust coke in a typical regeneration zone, a recycle gas is continuously circulated to the combustion section and a flue gas containing by-products of a coke combustion, oxygen and water is continually withdrawn. Coke combustion is controlled by recycling a low oxygen concentration gas into contact with the coke-containing catalyst particles. The flue gas/recycle gas is continuously circulated through the catalyst particles. A small stream of make-up gas is added to the recycle gas to replace oxygen consumed in the combustion of coke and a small amount of flue gas is vented off to allow for the addition of the make-up gas. The steady addition of make-up gas and the venting of flue gas establishes a steady state condition that produces a nearly constant concentration of water and oxygen in the recycle gas.

In continuous or semi-continuous regeneration process, coke laden particles are at least periodically added and withdrawn from a bed of catalyst in which the coke is combusted. Regions of intense burning that extend through portions of the catalyst bed develop as the coke is combusted.

One problem associated with localized regions of intense coke combustion is catalyst deactivation. The combination of temperature, water vapor, and exposure time determine the useful life of the catalyst. Exposure of high surface area catalyst to high temperatures for prolonged periods of time will create a more amorphous material having a reduced surface area which in turn lowers the activity of the catalyst until it reaches a level where it is considered deactivated. Deactivation of this type is permanent, thereby rendering the catalyst unusable. When moisture is present—water is a by-product of the coke combustion—the deactivating effects of high temperature exposure are compounded.

INFORMATION DISCLOSURE

U.S. Pat. No. 3,652,231 (Greenwood et al.) shows regeneration apparatus in which a constant-width movable bed of catalyst is utilized. The '231 patent also describes a continuous catalyst regeneration process which is used in conjunction with catalytic reforming of hydrocarbons. U.S. Pat. Nos. 3,647,680 (Greenwood et al.) and 3,692,496 (Greenwood et al.) also deal with regeneration of reforming catalyst. The teachings of patents ('231, '680, and '496) are hereby incorporated in full into this patent application.

SUMMARY OF THE INVENTION

It has been discovered that the removal of moisture from a combustion section of a regeneration zone will produce geometric increases in the life of a typical reforming catalyst. In order to take advantage of this extended catalyst life, a moisture removal method that can be readily integrated into existing regeneration processes without large capital expenditures or greatly increased complexity for the system is provided. This invention is in one of its broad aspects a method of controlling the water content in the combustion section of a regeneration zone by making inexpensive alterations to the arrangement and operation of the combustion section in the regeneration zone. This invention isolates a high moisture content portion of the flue gas from the combustion zone and vents at least a portion of this gas stream from the process to lower the overall equilibrium concentration of water in the circulating flue gas/recycle gas. During the initial stages of regeneration, a more readily combustible coke is oxidized first. This coke has a relatively high hydrogen concentration compared to the coke that is burned in later stages of combustion. Accordingly, a high proportion of the hydrogen that enters the combustion section is burned during the early stage of coke combustion. As a result, most of the water produced by the combustion of hydrogen is contained in the flue gas that exits the portion of the bed where the catalyst has been most recently added. Therefore, the flue gas from the area of the bed where the catalyst particles are added will have a relatively high moisture content. By withdrawing this high moisture content flue gas stream independently of the remainder of the flue gas, a higher proportion of the water generated during combustion can be withdrawn in the vent stream. Venting the high moisture content flue gas reduces the amount of water in the flue gas that is mixed with the make-up gas to form the recycle gas. As a result, the overall equilibrium of the water in the circulating flue gas/recycle gas is kept at a lower level.

It is possible by segregating the flue gas to recover a first flue gas stream that has a water concentration that is approximately 1.6 wt. % higher than the water concentration in the flue gas from the later stages of combustion. In a typical regeneration process, the recycle gas will have a moisture content of about 4.2 mol. %. By withdrawing high moisture content flue gas separately from the remainder of the flue gas, this moisture content in the recycle-make-up gas stream may be reduced to 3.5 mol. %. Thus, the method of this invention can significantly reduce the moisture content in the combustion zone thereby improving catalyst performance.

Accordingly, this invention is in one embodiment a method of reducing the water concentration during the combustion of coke in a process for removing coke from catalyst particles in a regeneration zone through which the particles move in at least semi-continuous flow. The method includes passing catalyst particles containing coke deposits into a regeneration zone and forming bed of the particles in a combustion section of the regeneration zone. Periodically the particles are moved through the bed by withdrawing particles from an outlet end of the bed and adding particles to an inlet end of the bed. An oxygen-containing recycle gas stream is passed through the bed to combust coke and produce a flue gas comprising by-products of coke combustion including $CO_2$ and water. The flue gas is segregated into a first stream and at least one additional stream. The first stream comprises flue gas from the inlet end of the bed and the at least one additional stream comprises a remaining portion of the flue gas that is not collected in the first flue gas stream. At least a portion of the first flue gas stream is rejected from the process. At least a portion of the one additional flue gas stream is combined with a make-up stream to form the recycle gas stream.

In another aspect, this invention is an apparatus for the regeneration of catalyst particles. The apparatus includes a regeneration vessel and a particle inlet conduit located at the top of the regeneration vessel for transferring catalyst particles into the regeneration vessel. An inlet particle retaining member and an outlet particle retaining member are positioned in an offset arrangement in the vessel to define a vertically extending particle retaining space. The particle retaining members have perforated walls that permit gas to flow through them, but restrict particle flow. The particle retaining space has an upper portion that communicates with the particle inlet conduit. A particle outlet conduit communicates with a lower portion of the particle retaining space. A regeneration gas inlet is also located on the vessel in communication with a gas distributor that is in turn in communication with the inlet particle retaining member. A first gas collector communicates with an upper portion of the particle outlet member to collect a high moisture content flue gas while a second gas collector is in communication with a portion of the particle outlet member located below the upper portion of the particle outlet member. A first gas outlet communicates with the first gas collector while a second gas outlet communicates with the second gas collector.

Other objects, embodiments and details of this invention are presented in the following detailed description of the invention.

DETAILED DESCRIPTION OF THE INVENTION

Figure 1:
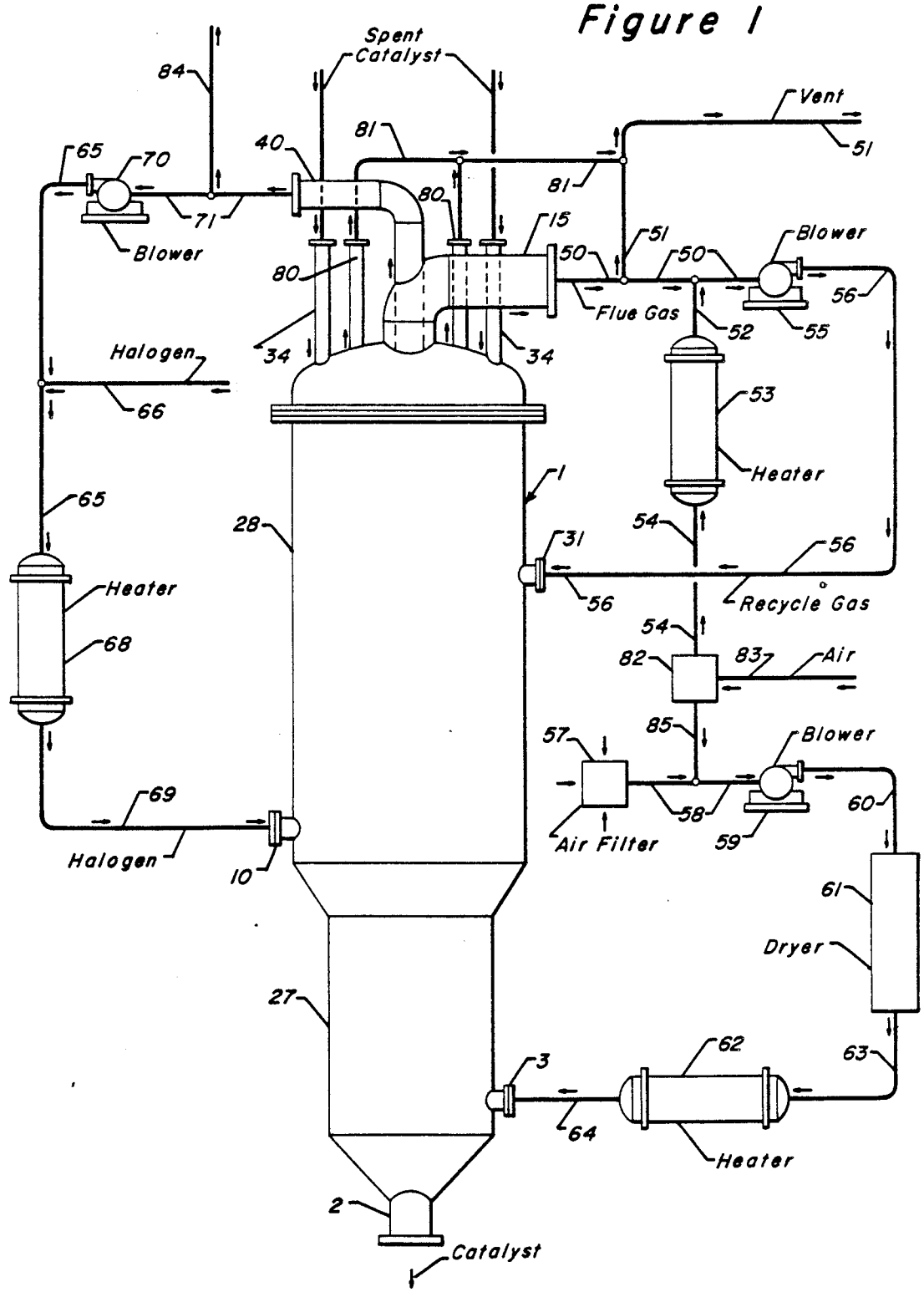
FIG. 1 is a schematic illustration of a regeneration zone and some of the equipment associated therewith.

In its broadest terms, this invention can be used to reduce the concentration of water in any process that consumes oxygen and produces water as a by-product. One such application that requires reduction of water concentration is in the removal of coke from catalyst particles in a regeneration zone. The coke is oxidized at high temperatures to form carbon dioxide, carbon monoxide and water. Temperatures for coke combustion are in excess of 700° F. In this reaction, a high water content, over time, has a deleterious effect on the activity of the catalyst. With continued exposure to high temperatures in a high moisture content environment, the catalyst will lose surface area and as a result become permanently deactivated. However, it is not necessary to limit this invention to coke combustion or regeneration processes since it may be generally applicable to other processes that use a recycle stream to supply a low oxygen concentration gas to an oxygen-consuming and water-producing reaction.

However, the most widely practiced hydrocarbon conversion process to which the present invention is applicable is catalytic reforming. Therefore the discussion of the invention contained herein will be in reference to its application to a catalytic reforming reaction system. It is not intended that such discussion limit the scope of the invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. Nos. 4,119,526 (Peters et al.); 4,409,095 (Peters); and 4,440,626 (Winter et al.).

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chlorine. Alumina is a commonly used carrier. The preferred alumina materials are known as the gamma, eta and theta alumina with gamma and eta alumina giving the best results. An important property related to the performance of the catalyst is the surface area of the carrier. Preferably, the carrier will have a surface area of from 100 to about 500 $m^2/g$. It has been discovered that removal of moisture from a combustion zone for a reforming catalyst will produce a more than linear increase in the life of a typical reforming catalyst. The particles are usually spheroidal and have a diameter of from about 1/16th to about ⅛th inch (1.5–3.1 mm), though they may be as large as ¼th inch (6.35 mm). In a particular regenerator, however, it is desirable to use catalyst particles which fall in a relatively narrow size range. A preferred catalyst particle diameter is 1/16th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In preferred form, the reformer will employ a moving bed reaction zone and regeneration zone. The present invention is applicable to a moving bed regeneration zone and a fixed bed regeneration zone. Fresh catalyst particles are fed to a reaction zone, which may be comprised of several subzones, and the particles flow through the zone by gravity. Catalyst is withdrawn from the bottom of the reaction zone and transported to a regeneration zone where a hereinafter described multi-step regeneration process is used to recondition the catalyst to restore its full reaction promoting ability. Catalyst flows by gravity through the various regeneration steps and then is withdrawn from the regeneration zone and furnished to the reaction zone. Movement of catalyst through the zones is often referred to as continuous though, in practice, it is semi-continuous. By semi-continuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed or replaced.

When using the method of this invention in a batch, continuous, or semi-continuous catalyst regeneration process, catalyst is contacted with a hot oxygen-containing gas stream (known in reforming processes as recycle gas) in order to remove coke which accumulates on surfaces of the catalyst while it is in a hydrocarbon conversion reaction zone. Coke is comprised primarily of carbon but is also comprised of a relatively small quantity of hydrogen. The mechanism of coke removal is oxidation to carbon monoxide, carbon dioxide, and water. Coke content of spent catalyst may be as much as 20% of the catalyst weight, but 5–7% is a more typical amount. Within the combustion zone, coke is usually oxidized at temperatures ranging from 900° to 1000° F., but temperatures in localized regions may reach 1100° F. or more.

Oxygen for the combustion of coke enters what is called a combustion section of the regeneration zone in what has been termed a recycle gas. The recycle gas contains a low concentration of oxygen usually on the order of 0.5 to 1.5% by volume. The arrangement of a typical combustion section may be seen in U.S. Pat. No. 3,652,231. As the coke is combusted, the small amount of hydrogen within the coke reacts with the oxygen to form water. Flue gas made up of carbon monoxide, carbon dioxide, water and unreacted oxygen and other non-reactive gases are collected from the combustion section and withdrawn from the regeneration zone as flue gas. Thus, the recycle gas and flue gas form a recycle gas loop wherein flue gas is continually withdrawn from the process mixed with an oxygen-containing gas to replenish consumed oxygen and returned to the combustion section as recycle gas. A small amount of the flue gas is vented off from the process to allow the addition of an oxygen-containing gas called make-up gas. The oxygen-containing gas is combined with the flue gas to replace the oxygen consumed by the coke combustion and the combined gas is recycled to the combustion section. In the past, the oxygen-containing gas was typically air. The amount of air needed in past regeneration processes to replenish the oxygen consumed during the coke combustion is relatively small, about 3% of the volumetric rate of the recycle gas stream.

All of the oxygen supplied to an upper region of the bed is consumed, since an abundant amount of coke is present. As catalyst particles move downward in the bed and coke is removed, a point is reached where less than all of the oxygen delivered is consumed. This is termed the breakthrough point. Typically, breakthrough occurs at a location spaced about half the distance down the total length of the bed in the combustion section. It is known to those skilled in the art that catalyst particles of the type used in the hydrocarbon conversion processes of this invention have a large surface area, which results from the existence of a multiplicity of pores. When the catalyst particles reach the breakthrough point in the bed, the coke left on the surface of the particles is deep within the pores and therefore the oxidation reaction occurs at a much slower rate.

Reiterating again, the combustion of coke also produces water. The only place for the water to escape from the process is in the small amount of vented flue gas. Therefore, the water concentration in the recycle loop increases until the difference between the amount of water entering with the make-up gas stream and the amount of water leaving with the vent stream equal the amount of water produced during the combustion of coke and equilibrium is reached. The water circulating within the recycle gas loop created a constant steam concentration during the coke combustion process. The water concentration in the recycle loop could be lowered by drying the air that made up the make-up gas or installing a drier for the gas circulating in the recycle gas loop. Again, due to the relatively low native moisture content of the make-up gas, drying the make-up gas air would not significantly reduce the water in the recycle gas loop. Due to the large volume and high temperature of the recycle gas, recycle gas drying would be expensive and difficult to carry out.

In a preferred embodiment of this invention, some or all of the vented flue gas is withdrawn directly from an inlet portion of a catalyst bed. The formation of water occurs very rapidly upon exposure of the coke to the oxygen in a combustion section. Flue gas exiting the inlet portion of the catalyst bed will contain a higher concentration of water than flue gas exiting the lower portions of the bed. By the selective withdrawal of gas from an upper portion of the bed, the flue gas having the highest concentration of water is removed from the recycle gas loop. Consequently, the smaller addition of water to the recycle gas loop lowers the water concentration therein.

The amount of high moisture content flue gas withdrawn from the inlet portion of the bed can vary. In the simplest form of this invention, the amount of high moisture content flue gas withdrawn from the regeneration section will equal the amount of make-up gas that is added to the recycle stream. Usually this will mean a withdrawal of about 2-7 wt. % of the flue gas in the high moisture flue gas stream. Withdrawing more flue gas in the high moisture content flue gas stream than will be vented from the process requires the unvented portion of the high moisture content flue gas stream to be recombined with the recycle gas stream. Recombining the unvented portion of the high moisture content flue gas stream in this manner requires additional piping and control. Nevertheless, in view of variations in the operation of the process, it may be desirable to arrange the hardware for the regeneration section such that a larger quantity of high moisture content flue gas is withdrawn and the amount rejected from the process can be adjusted by altering the proportion of vented and recycled high moisture content flue gas.

There may be several advantages to isolating a larger amount of the flue gas as the high moisture content flue gas stream than will be vented from the process. In order to use the invention most effectively, it is desirable to adjust the amount of flue gas withdrawn as the high moisture content flue gas stream in order to maximize its moisture content. Therefore, in order to maximize the moisture content without over complicating the equipment for gas collection, all of the flue gas in the inlet portion of the particle bed may be withdrawn. Since initiation of burning takes some time within the combustion zone, the maximum region of water generation for the bed may occur at a slight distance downward from the point where catalyst particles are first added to the bed. As a result, recycled gas passing through the extreme inlet portion of the bed may have a lower moisture content than the flue gas in a slightly downstream portion. However, in order to simplify the apparatus, flue gas from the first inlet point down to a point of reduced hydrogen combustion can be withdrawn in a high moisture content flue gas stream.

Where high moisture content flue gas in excess of the amount of flue gas vented is withdrawn, the process may be further improved by adding drying equipment. As previously stated, it is impractical to dry the entire recirculating stream of flue gas and recycle gas. However, the amount of high moisture content flue that is not vented from the process represents a relatively small volume of the recycle stream. Drying only this high moisture content portion of the stream and returning it to the recycle loop offers a more cost effective arrangement for the utilization of drying equipment. This stream of dried flue gas when combined with the make-up gas stream can be used in effect to reduce the oxygen concentration of the make-up gas entering the process so that additional high moisture content flue gas can be vented from the process and thereby, further reduce the equilibrium water concentration in the recycle loop. When the flue gas stream that is rejected from the process is used as part of the make-up gas stream, it is also desirable to treat it for the removal of chlorides and sulfur compounds before it is compressed, dried and mixed with air to provide the make-up gas stream.

Whether supplied as part of the vented flue gas stream or obtained from another source, the use of an oxygen-deficient gas stream offers a number of advantages to the regeneration process. As previously stated by decreasing the concentration of oxygen in the make-up gas, a larger quantity of make-up gas must be added to the process in order to maintain a given oxygen concentration. The addition of more make-up gas requires the venting of more flue gas since the water concentration in the make-up gas is lower than the flue gas, an increase in the amount of gas vented decreases the water concentration in the recycle gas loop. Reducing the oxygen concentration in the make-up gas from the usual 21% oxygen found in air to about 7% will allow a three times increase in the amount of make-up gas added to the recycle gas and vented from the flue gas. For a typical regeneration process doubling the make-up gas addition reduces a moisture content of 4.2 mol. % in the recycle loop to 2.5 mol. %. Thus, a reduction in the oxygen concentration of the make-up gas together with a selective withdrawal of the flue gas can greatly reduce the water concentration in the recycle loop. Such a reduction offers significant benefits. For example, decreasing the water concentration from 4.2 to 2.5 mol. % will approximately double the surface life of the catalyst when used in a 1200° F. combustion section.

Suitable make-up gas streams having an oxygen content less than air can be obtained by a variety of methods. A typical make-up gas stream for this invention will have a maximum oxygen concentration of from 10 to 12 mol % and preferably will have an oxygen concentration of less than 7 mol %. A number of processes are known for enriching air streams with oxygen or nitrogen. These processes can use selective adsorbents, gas permeable membranes or a combination of both to generate such streams. One such process that uses a gas permeable membrane to enrich an oxygen stream and produce a non-permeate gas stream with an increased nitrogen concentration is shown in U.S. Pat. No. 4,787,919, the teachings of which are hereby incorporated by reference. This gas system has the added advantage of simultaneously reducing the moisture content of the non-permeate nitrogen stream. Additional diffusion membranes for the separation of gases are also shown in U.S. Pat. No. 3,830,733, the teachings of which are herein incorporated by reference. These and other commercially available processes can economically produce nitrogen-enriched gas streams having oxygen concentrations of 7% or less.

Nevertheless, the method of producing an oxygen-deficient make-up gas stream using the vented flue gas is probably the simplest. The vented flue gas consists of nitrogen, carbon dioxide, water vapor, oxygen, hydrogen chloride, chlorine and sulfur dioxide; its temperature is in excess of 900° F. Wet scrubbing can be used to remove the chlorides and $SO_2$. In fact, it is already common practice in some regeneration zones to remove the chlorides and sulfur compounds from the vented flue gas by wet scrubbing. Additionally, once a scrubber is in place, the flue gas exiting the scrubber is near ambient temperature, and is easily recompressed, dried and recycled to the make-up gas stream. Mixing a treated flue gas stream with the make-up gas can be more cost-effective, from the standpoint of both energy and capital, than using an oxygen/nitrogen membrane for producing the oxygen-deficient gas stream. The advantages of using a treated flue gas stream are most evident in regeneration zones that operate at superatmospheric pressure where the higher pressure, usually in the range of 15 to 50 psi, reduces the concentration of water in the flue gas as it exits the scrubber.

Below the combustion section, the regeneration zone will usually include additional treatment steps for the catalyst. One such step is a halogenation step. The halogenation step provides the means of incorporating and maintaining the desired level of halogen in the final catalytic composite. The halogen adjustment step employs a halogen, or halogen-containing compound in air or an oxygen atmosphere. The preferred halogen for incorporation into the catalytic composite is chlorine. The preferred halogen or halogen-containing compound utilized during the halogenation step is chlorine, HCl or a precursor of these compounds. An oxygen atmosphere is generally employed and desired in carrying out the halogenation step. The presence of oxygen aids in the dispersion of the metallic catalyst components on the carrier. A lower water concentration in the environment of the combustion section can facilitate the halogenation step as catalyst with a lower water content drops downward into the halogenation section of the regeneration zone. The concentration of chlorine in the halogenation section is governed by the Deacon equilibrium equation.

$$HCl + O_2 \rightleftharpoons H_2O + Cl_2$$

Therefore, to the extent that the catalyst entering the halogenation section has a lower water concentration it will shift the equation to the right to produce more chlorine for the halogenation step. Since oxygen aids in the redispersion of platinum, additional benefits are obtained by the method of this invention when the production of the oxygen-deficient make-up gas stream also produces an oxygen-enriched stream that may be passed into the halogenation section to increase the oxygen concentration and further promote the dispersion of the catalytic metal on the carrier. However, when an oxygen-enriched gas is introduced into the halogenation zone, it must not be vented through the combustion zone; to do so would increase the oxygen concentration in the recycle gas and negate the effects of the oxygen-deficient make-up gas.

After passing to the combustion zone and halogenation zone, the catalyst is usually passed into a drying zone for the removal of water formed in the combustion zone and remaining on the catalyst particles. The typical arrangement for drying the particles charges a heated air stream into the drying section of the regeneration zone and contacts the particles in countercurrent flow. Relatively dry catalyst particles are withdrawn from the bottom of the regeneration zone and the water-containing oxygen gas stream flows upward out of the drying section.

The water-laden gas stream usually enters the halogenation section to supply the desired oxygen in the combustion section. Gas from the drying section and halogen-containing gas mix in the halogenation section and can either flow upward into the combustion section or be removed prior to entering the combustion section. Since the gas from the halogenation section will usually contain a relatively large water concentration, it is desirable to separately withdraw this gas stream before it enters the combustion section.

The coke content of catalyst exiting the combustion section is approximately 0.2% or less of the weight of the catalyst. Much of this residual coke is burned off in the halogenation zone or, if the halogenation zone is omitted, in the drying zone. Were catalyst leaving the combustion section to have on it a larger amount of coke, the temperature in the section below the combustion section would rise to an unacceptably high value, as a result of the heat of combustion.

The simple and effective water removal method of this invention allows the regeneration zone to be operated more profitably. The presence of moisture in the combustion section decreases the catalyst surface area and shortens its life, thereby creating higher catalyst replacement cost. The small cost associated with addition of equipment for isolating high moisture content flue gas is much smaller than the cost associated with catalyst replacement. Therefore, in balance, the overall cost for the regeneration process are reduced. Further cost advantages are realized when an oxygen-enriched stream is produced along with the oxygen-deficient make-up gas stream so that water removal and conditioning of the catalyst in the halogenation section is enhanced.

Figure 2:
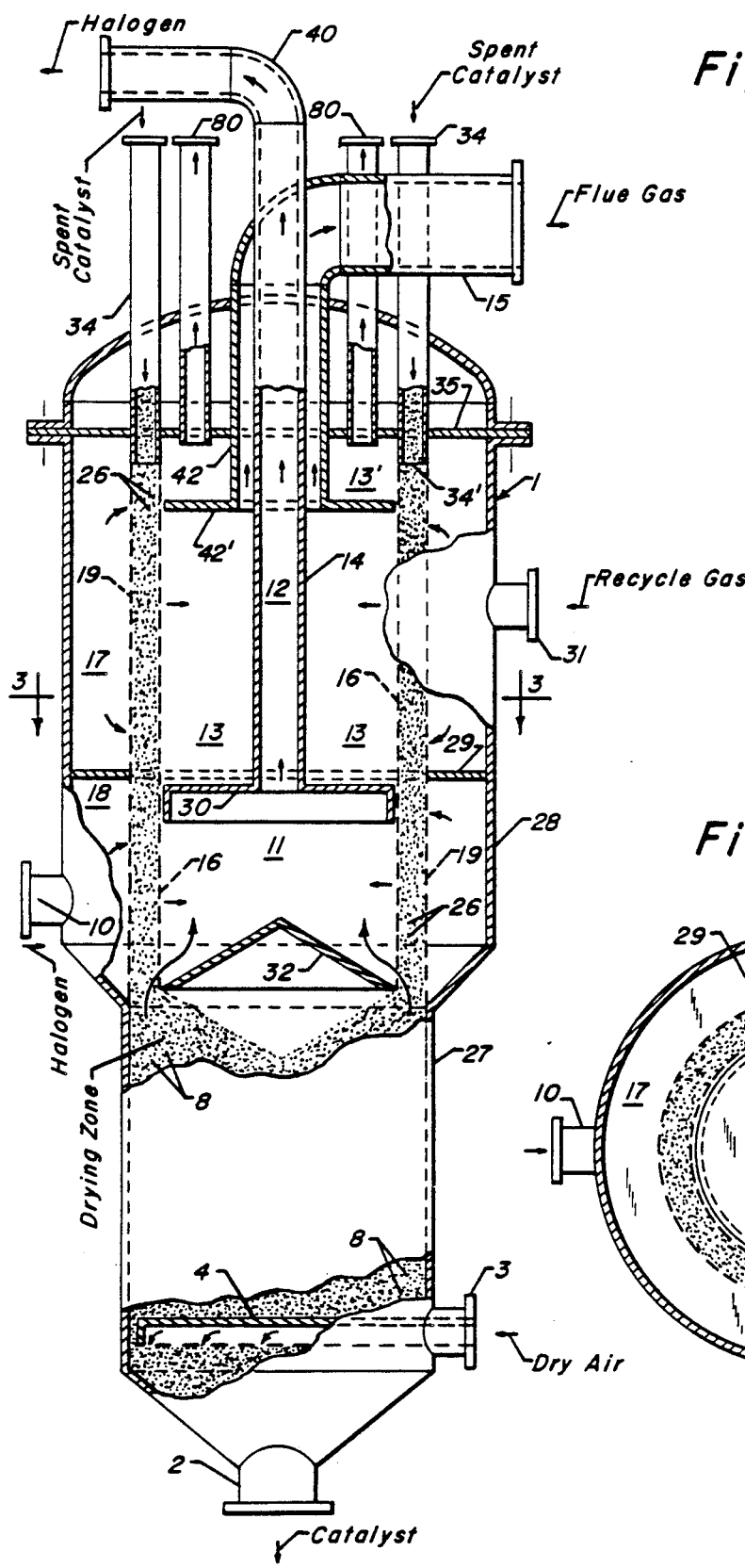
FIG. 2 is a partial cross-sectional elevation of the regeneration zone shown in FIG. 1.
Figure 3:
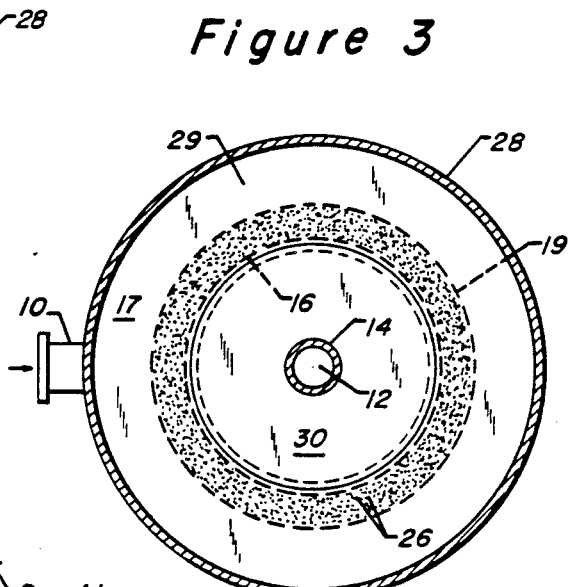
FIG. 3 is a section of the reaction zone taken across line 3—3 of FIG. 1.

FIGS. 1-3 will now be utilized in describing a specific example of the invention; such use is not intended to limit the broad scope of the invention as presented in the claims. The Drawings show only elements and equipment which are essential to a clear understanding of the invention. Application and use of additional required items is well within the purview of one skilled in the art. U.S. Pat. Nos. 3,652,231, 3,647,680 and 3,692,496, which have been made a part of this document, may be consulted for additional detailed information.

Referring now to FIG. 1, spent catalyst particles are introduced into regeneration vessel 1 by means of nozzles 34. Catalyst is removed from regenerator 1 at the lower end through nozzle 2. Regenerator 1 has an upper section 28 and a lower section 27.

Flue gas leaves the upper section of the regeneration vessel through nozzles 15 and 80. Flue gas exiting through nozzle 15 is conveyed to blower 55 by pipeline 50. A portion of the flue gas leaving the regenerator through pipeline 50 is vented from the system by pipeline 51. Additional flue gas is removed from the system by pipeline 81 that connects nozzles 80 with line 51. Make-up gas is heated by passage through heater 53 and added to the flue gas by pipeline 52. Heater 53 heats the recycle gas to carbon-burning temperatures during start-up and to a lesser degree adds heat to the recycle stream during normal operation. It should be noted that FIG. 1 shows the heater in a location that corresponds to a preferred arrangement for operation with oxygen-deficient make-up gas stream, in other arrangements, particularly those without an oxygen-deficient make-up gas stream, the heater is usually located in the recycle loop. Once the make-up gas is added to the flue gas, the combined gas stream is usually denoted "recycle gas." Recycle gas leaving blower 55 through pipeline 56 enters the regenerator through nozzle 31. Pipelines 50 and 56 together with a hereinafter described combustion section form a recycle loop.

A gas separation system 82 supplies make-up gas to the recycle loop. Air enters gas separation system 82 by a pipeline 83. Separation system 82 produces an oxygen-deficient gas stream, carried by pipeline 54 and an oxygen-enriched gas stream carried by pipeline 85. The oxygen-deficient make-up gas is added to the recycle gas at a volumetric rate generally equal to the amount of gas vented from line 51.

FIG. 1 also depicts a halogenation loop for performing the halogenation step. A halogenation gas stream is provided to the halogenation section of the regenerator by nozzle 10. The halogenation gas exits the regenerator through nozzle 40 and is conveyed to heater 68 by pipelines 71 and 65 and by blower 70. Make-up halogen is added to the halogenation gas by pipeline 66. After the halogenation gas is heated, it passes through pipeline 69 to regenerator upper section 28. In a manner hereinafter described, the halogenation gas is kept separate from the flue gas and recycle gas until removed from the regeneration by nozzle 40. Gas is vented from the halogenation loop by line 84.

Air from the atmosphere is drawn through filter 57 and pipeline 58 by blower 59. An oxygen-enriched stream from pipeline 85 is also drawn into pipeline 58. The oxygen-enriched stream and the air stream provide a drying gas that passes from blower 59 through a pipeline 60 and into a dryer 61 for water removal before entering a heater 62 via a pipeline 63. The air stream is heated in heater 62 and passed into lower regenerator section 27 via pipeline 64 and nozzle 3. Drying gas is combined with gas from the halogenation loop and eventually exits the process through pipeline 84.

Referring now to FIG. 2, outer and inner catalyst retention screens 16 and 19 extend vertically within the upper section 28 of regeneration vessel 1. Screens 16 and 19 together provide an inlet particle retaining member and an outlet particle retaining member. Outer screen 19 and inner screen 16 are cylindrical in form. The two catalyst retention screens have a central axis common with the central axis of the regeneration vessel. Screens 16 and 19 form a catalyst retention space through which a descending annular column of catalyst shown as bed 26, moves by gravity. Nozzles 34 deliver catalyst at points spaced around the annular bed. The catalyst screens provide perforated walls having openings sufficiently small to preclude catalyst particles from passing therethrough, but allowing gas flow. For a description of catalyst retention means, U.S. Pat. No. 3,652,231 may be consulted. The catalyst retention screens extend throughout the upper section of vessel 1 and deliver catalyst to the lower section 27 of regenerator 1.

The portion of the upper section of vessel 1 which is above a horizontal partition 29 is termed a combustion section. A space for distributing recycle gas around the catalyst bed provides a distributor and is formed between screen 19 and the sidewall of regeneration vessel 1 in upper section 28 and is divided by partition 29. Partition 29 forms a barrier between a recycle gas distribution space 17 and a halogenation gas distribution space 18. Recycle gas enters the space 17 through recycle gas nozzle 31. A partition 35 provides a top closure for space 17. Recycle gas flows radially, or horizontally, from space 17 through bed 26 to a central space 13 which provides a collector. A halogen conduit 14 occupies a portion of space 13. A lower boundary for central space 13 is provided by enlarged end 30 of conduit 14. A top collection space 13' that provides another collector is separated from central space 13 by a partition in the form of an annular plate 42' at the bottom of conduit 42. Annular plate 42' provides a top closure for central space 13 and a bottom closure for upper space 13' and divides the entire collection space into two chambers. Central space 13 is termed a primary flue gas collection space. Conduits 42 and 14 and the catalyst nozzles 34 pass through partition 35. Conduit 42 is an extension of nozzle 15 that communicates nozzle 15 with gas collection space 13. Conduit 14 extends from nozzle 40 and passes through collection space 13.

Top collection space 13' collects flue gas from the uppermost portion of bed 26. Partition 35 provides the top closure for collection space 13' and conduit 42 forms the innermost boundary. Annular plate 42' is typically positioned so that the uppermost 5-15% of the open area of screen 16 within the combustion section borders space 13' so that 5-15% of the flue gas flow is into space 13'. The length of collection space 13' is usually sized so that the gas flow into space 13' equals the make-up gas flow. Top collection space 13' collects the flue gas having the higher water content from the collection section. This high moisture content flue gas is withdrawn from collection space 13' by nozzles 80 that pass through partition 35 and communicate with space 13'.

The portion of upper regenerator section 28, located below partition 29, is termed a halogenation section. A halogen-containing gas enters the zone via halogenation nozzle 10, flows into halogenation gas distribution space 18, and then flows through the catalyst in a radial manner before entering a halogenation collection space 11. A lower boundary of distribution space 18 is formed by a necked-down portion of the regenerator at the bottom of upper section 28. End closure 30 of conduit 14 forms the upper boundary and end closure 32 forms the lower boundary of collection space 11. The outer edges of end closure 30 are positioned close to screen 16 to prevent the moisture-rich and high-oxygen concentration gas in the halogenation section from mixing with the flue gas in space 13.

Screen 19 extends a short distance into the lower section 27 of vessel 1, which is of a smaller diameter than the upper section. The outside diameter of screen 19 is slightly smaller than the inside diameter of lower section 27. Catalyst discharged from bed 26 fills all of lower section 27 of vessel 1 and forms a bed 8 that provides a drying section. Catalyst moves downward through the lower section of the vessel and out of the vessel through catalyst outlet nozzle 2.

Nozzle 3 on regeneration vessel 1 is equipped with means for distributing air, consisting of perforated pipe 4, to various points in a horizontal plane which is perpendicular to the descending catalyst. Pipe 4 distributes air uniformly up the column so that it contacts all of the catalyst in bed 8.

Air entering the vessel via pipe 4 has been dried so that it contains no more than about 5 parts per million (by volume) of water and has also been heated. The hot air passes upwardly through bed 8 removing moisture which is contained on the catalyst. Essentially all of the air moving up the column lower section passes into collection space 11. The air stream from the drying zone mixes with gas which has passed through the catalyst from distribution space 18 to collection space 11 and the combined stream enters halogen conduit 14 to flow out of the regeneration vessel via halogen nozzle 40. The vessel is designed so that substantially all of the gas in central space 11 enters conduit 14. By substantially it is meant that between 80 and 100% of the air from central space 11 enters conduit 14. In the embodiment of FIG. 2, this is accomplished by enlarged end 30.

FIG. 3 depicts a portion of the conduit and screen arrangements. Halogen conduit 14 having an interior 12 is centered on the vertical axis of the vessel. Catalyst retentions screens 16 and 19 enclose the downward moving bed of catalyst 26. Gas in gas distribution space 17 flows radially through the catalyst to central space 13.

The regeneration zone can be designed so that a portion of halogenation gas which passes through the bed in the halogenation zone enters central space 13, by placing the end portion 30 of conduit 14 below partition 29. In this way, gas passing through the catalyst in the halogenation zone can provide some of the oxygen for combustion of carbon on catalyst in the burn zone and then mix with the portion of upwardly flowing gas from the halogenation zone that did not enter conduit 14. Of course, the amount of such gas should be limited so that most of the oxygen for combustion is provided by the addition of make-up gas through conduit 52.

For a typical regeneration zone, the rate of catalyst movement through a 6 inch (15.2 cm) constant-width bed or a tapered bed varying from a 3 inch (7.6 cm) thickness to a 9 inch (22.9 cm) thickness may range from as little as 200 pounds per hour (90.7 kg) to 1000 pounds per hour (453.6 kg) or more. Typical bed lengths for this range of catalyst flow rate are from about 4 feet (1.22 m) to about 20 feet (6.1 m). The diameter of the inner catalyst retention screen at the top will often be in excess of 36 inches (0.91 m), in order to accommodate a 36 inch flue gas pipe. Where larger catalyst movement rates are required, bed thickness may be increased. For example, for a 2000 pound per hour (907.2 kg) catalyst flow rate, a constant-width bed may be 9 inches (22.86 cm) thick. Bed length will be about 13 feet (5.15 m).

FIG. 1 shows the method of this invention being practiced with a system 82 that produces an oxygen-deficient gas stream. An alternative to system 82 is the use of the vented flue gas from line 51 as the source of the oxygen-deficient gas stream. For example, supplying the oxygen-deficient gas to a regeneration zone having a 2000 pound per hour catalyst flow rate would require recompressing about 10,000 standard cubic feet per hour of the wet vent gas. In many cases, it will take a fraction of the power to recompress the vent gas as opposed to the power requirements for operating a membrane system for recovering an oxygen-deficient gas stream. Capital costs for the necessary equipment to use the vent gas, such as scrubbers and driers, are usually lower than the cost of a membrane system. Therefore, the use of vented flue gas as a source of an oxygen-deficient gas can have cost advantages.

The description of this invention in the context of a preferred regeneration arrangement is not intended to limit its application to the details shown therein. The method of this invention can be used advantageously to control the water content in a recirculating gas stream for any oxygen-consuming process that produces water.

What is claimed is:

1. A method of reducing the water concentration during the combustion of coke in a process for removing coke from catalyst particles in a regeneration zone through which the particles move in at least semi-continuous flow, said method comprising:
    (a) passing catalyst particles containing coke deposits into said regeneration zone and withdrawing regenerated catalyst particles from said regeneration zone;
    (b) forming an elongated bed of said particles in a combustion section of said regeneration zone having an inlet end where catalyst particles containing coke deposits enter said bed and an outlet end where regenerated catalyst particles are withdrawn from the bed after the combustion of coke from the particles and a first and a second elongated side open for transverse gas flow through said bed;
    (c) at least periodically moving said particles through said bed by withdrawing regenerated catalyst particles from an outlet end of said bed and adding catalyst particles containing coke deposits to an inlet end of said bed;
    (d) passing an oxygen-containing recycle gas stream through said first elongated side and through said bed to combust coke and producing a flue gas comprising by-products of coke combustion including $CO_2$ and water, and passing said flue gas out of said bed through said second elongated side;
    (e) segregating said flue gas as it leaves said second elongated side into a first flue gas stream and a second flue gas stream, said first flue gas stream comprising flue gas withdrawn from said inlet end, with respect to the entering catalyst particles, of said bed in said combustion section and said second stream comprising flue gas withdrawn from the outlet end, with respect to the entering catalyst particles, of said bed;
    (f) rejecting at least a portion of said first flue gas stream from said process; and
    (g) combining at least said second stream with a make-up gas stream to form said recycle gas stream.

2. The method of claim 1 wherein all of said first flue gas stream is rejected from the process.

3. The method of claim 1 wherein 2 to 30 wt. % of the flue gas from said bed is taken by said first flue gas stream.

4. The method of claim 1 wherein said make-up gas stream has an oxygen concentration less than ambient air.

5. The method of claim 1 wherein from 2 to 7 wt. % of said flue gas is rejected in said first stream.

6. The method of claim 1 wherein less than all of said first flue gas stream is rejected from the process and the unrejected portion of said first stream is dried to remove moisture and combined with said second flue gas stream to provide a portion of said recycle gas.

7. The method of claim 1 wherein said make-up gas stream is at least in part obtained by compressing and drying at least a portion of said first flue gas stream rejected from said process.

8. The method of claim 1 wherein the portion of said first flue gas stream rejected from said process is treated to remove chlorides and sulfur compounds, compressed, dried, and mixed with air to provide said make-up gas stream.

9. A method of reducing the water concentration during the combustion of coke in a process for removing coke from catalyst particles in a regeneration zone through which the particles move in at least semi-continuous flow, said method comprising:
    (a) passing catalyst particles containing coke deposits into said regeneration zone and withdrawing regenerated catalyst particles from said regeneration zone;
    (b) forming a vertically-elongated bed of said particles in a combustion section of said regeneration zone;
    (c) at least periodically moving said particles down said bed by withdrawing regenerated catalyst particles from the bottom of said bed and adding catalyst particles containing coke deposits to the top of said bed;
    (d) passing a recycle gas stream comprising oxygen through the particles in said combustion section to combust coke and produce flue gas comprising by-products of coke combustion including $CO_2$ and water;
    (e) withdrawing a first flue gas stream comprising a portion of said flue gas from an upper portion of said bed in said combustion section and venting a portion of said first flue gas stream to remove at least a portion of said first flue gas stream from said process;

(f) withdrawing at least one additional flue gas stream comprising another portion of said flue gas from said bed in said combustion section; and (g) combining said at least one additional flue gas stream with a make-up gas stream comprising oxygen to produce said recycle gas stream.

10. The method of claim 9 wherein said first flue gas stream is taken from at least the upper 5% of the elongated bed in said combustion section.

11. The method of claim 10 wherein all of said first flue gas stream is removed from the process.

* * * * *